INVENTOR.
Lloyd Wilson Head

May 27, 1952 L. W. HEAD 2,598,641
THERMOSTATIC CONTROL OF SEAL LEG VALVES
Filed May 18, 1949 2 SHEETS—SHEET 2
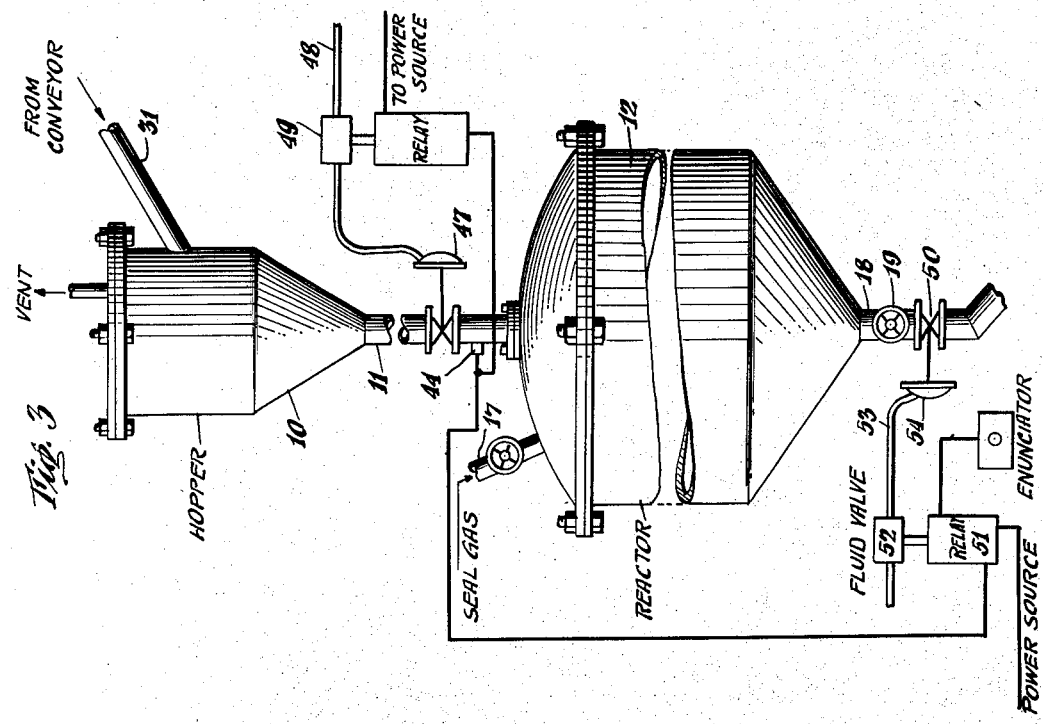
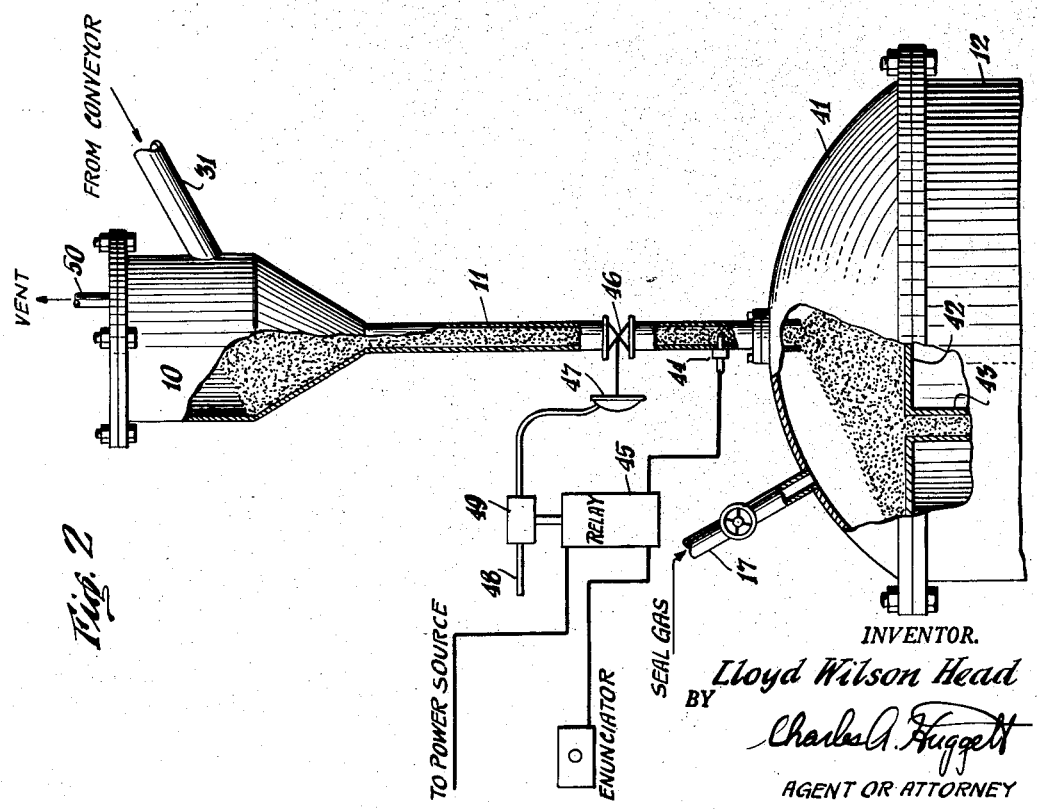
INVENTOR.
Lloyd Wilson Head
BY Charles A. Huggett
AGENT OR ATTORNEY Patented May 27, 1952

2,598,641

UNITED STATES PATENT OFFICE 2,598,641

THERMOSTATIC CONTROL OF SEAL LEG VALVES

Lloyd Wilson Head, Beaumont, Tex., assignor to Socony-Vacuum Oil Company, Incorporated, New York, N. Y., a corporation of New York Application May 18, 1949, Serial No. 93,996

6 Claims. (Cl. 23—1)

This invention is directed to a method and apparatus for safeguarding against the escape of fluids from a vessel in which the fluids are contacted with a continuously-flowing hot, particle-form, contact mass at pressures above that of a supply hopper located above. An example of this type of process is the catalytic cracking of hydrocarbons in which a particle-form contact material is passed downwardly through a reaction vessel in the form of a gravitating bed, said column extending above the reaction vessel through a suitable feed conduit into a supply hopper. Selected hydrocarbons, usually in the nature of a gas oil, are introduced into the vessel in a preheated vapor state, wherein they contact the particle-form catalyst maintained at conversion temperatures, in the neighborhood of 800–1200° F. The hydrocarbons are converted under these conditions of temperature and a pressure somewhat above atmospheric in the presence of the solid adsorbent contact mass, and the converted products are continuously withdrawn from the reaction zone. The catalyst mass usually partakes of the nature of fuller's earth, or other natural or treated clays and/or various other synthetic compounds or associations of alumina, silica or silica and alumina, for example. Such contact material may desirably fall within the range of about 4 to 20 mesh. A small amount of fines formed by attrition of the normal sized particles will also be present.

In more complete form, this process is one in which the particle-form material is moved cyclically through two zones. The contact mass is first gravitated downwardly through a reaction zone where it is contacted with hydrocarbon reactants at suitable temperature and pressure to cause conversion to more desirable products. The contact material becomes coated with carbon and carbonaceous material and is then removed from the reaction zone and transported by bucket elevator to the top of a regeneration zone where the contact material is subjected to regeneration by combustion supporting gas, burning the deposits from the surface of the catalyst. The catalyst, after gravitating through the regeneration zone, is transported to the top of the reaction zone, usually by another bucket elevator. It is customary to supply the catalyst from the tops of the elevators into storage hoppers located above each zone, and then feed the contact material downwardly from the hoppers through feed legs into the respective zone. The pressure in the hopper is usually atmospheric whereas the pressure in the vessel below may be approximately 5 pounds above atmospheric. The feed leg must therefore be sufficiently long to provide a head of catalyst sufficient to force catalyst into the vessel against this pressure differential. In addition, an inert seal gas is usually admitted to the top of the vessel, flowing upwardly through the feed leg and out a vent opening in the storage hopper.

This invention is particularly directed to preventing the reactant vapors in the reaction vessel from escaping up through the contacting material feed leg when the flow of contacting material through the feed leg is interrupted, causing a loss of seal. For a variety of reasons the normal downward flow of particle-form material in the feed leg is interrupted, allowing the highly heated, reactant vapors to escape to various locations in the apparatus to burn upon contact with air. Dangerous explosions may be encountered in apparatus not constructed to withstand high pressures, or damage may be inflicted to moving parts, such as elevators, not equipped to operate under such conditions.

The object of this invention is to protect the apparatus from damage caused by escaping reactant vapors in these instances when the feed leg seal is broken, by automatically closing the feed leg just after the rupture of the seal. Another object of this invention is to actuate a warning device to indicate the impending rupture of seal in the reactor feed leg, enabling steps to be taken to prevent the loss of seal. And still another object of this invention is to prevent the reactor from being partially or completely drained of catalyst when the flow of catalyst through the feed leg is interrupted.

These and other objects of the invention will become apparent from the following discussion of the invention.

The invention may be most easily understood by reference to the drawings attached hereto of which, Figure 1 is an elevational view showing the general arrangement of a cyclic hydrocarbon conversion system of the type to which this invention pertains;

Figure 2 is a vertical view, partially in section, showing in detail the upper section of one of the chambers of Figure 1, the particle-form material feeding means and the application of the apparatus of the invention thereto;

Figure 3 is a vertical view of one of the vessels of Figure 1 and its related apparatus, showing another embodiment of the invention. All these drawings are highly diagrammatic in form.

Figure 1:
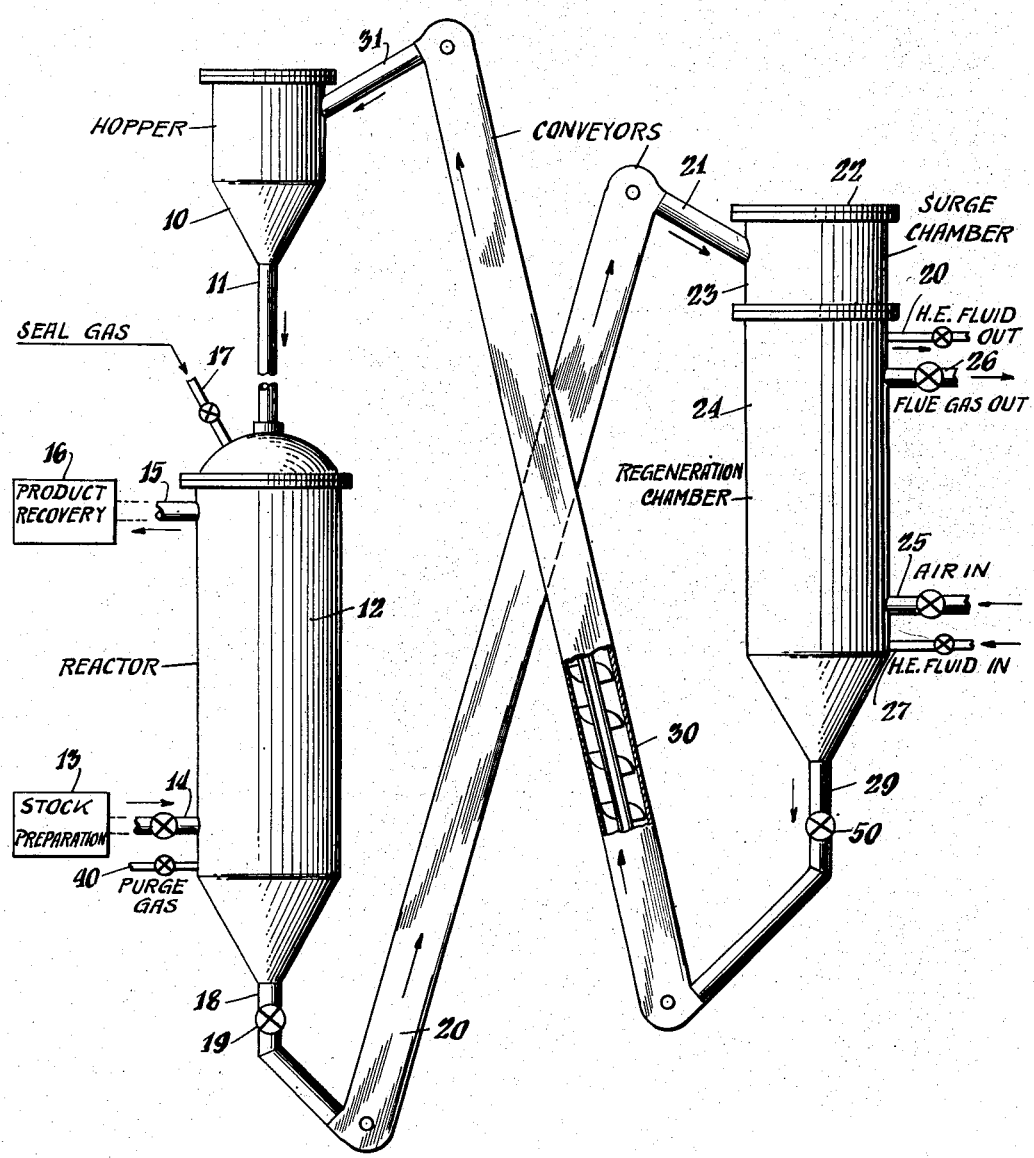

Referring now to Figure 1 there is shown a cyclic system for catalytic conversion of high boiling hydrocarbons such as gas oil fractions to gasoline and other products. Catalyst in particle form, varying in size, for example 4-20 mesh (Tyler screen analysis) catalyst, passes from a supply hopper 10 downwardly through an elongated gravity feed leg 11 into the upper end of reaction vessel 12. The catalyst moves downwardly through vessel 12 as a substantially compact column while being contacted with hydrocarbon vapors introduced from stock preparation system 13 of conventional type into the lower section of vessel 12 via conduit 14. The gaseous hydrocarbon products pass from the upper section of the vessel 12 through conduit 15 to the product recovery system 16. The escape of hydrocarbons through the feed leg 11 is prevented partially by maintaining a blanket of an inert seal gas such as steam or flue gas within the upper end of vessel 12 and partially by the throttling action of the catalyst in the feed leg. The seal gas is introduced through conduit 17. Spent catalyst bearing a carbonaceous deposit is withdrawn from the lower end of vessel 12, through conduit 18 at a suitable rate controlled by valve 19. The catalyst is purged substantially free of gaseous hydrocarbons before being withdrawn from vessel 12 by means of an inert purge gas such as steam or flue gas introduced at 40. The spent catalyst passes to conveyor 20 by which it is conducted to sloping supply duct 21 which supplies catalyst to the upper section of regenerator vessel 22. Regenerator vessel 22 is comprised of an upper catalyst surge chamber 23 and a communicating lower burning chamber 24. Air is introduced to the burning chamber near its lower end through conduit 25. The air moves upwardly through the column of gravitating catalyst particles in burning chamber 23 so as to burn off the carbonaceous deposit therefrom and is withdrawn near the upper end of chamber 23 through conduit 26. A suitable heat exchange fluid is introduced to heat transfer tubes (not shown) within the chamber 23 via conduit 27. The fluid passes through the heat transfer tubes to remove the excess heat of contaminant combustion from the catalyst and is withdrawn from the tubes via conduit 28. Regenerated catalyst passes from the lower end of chamber 23 via conduit 29 to conveyor 30 by which it is conducted to the downwardly sloping duct 31 supplying hopper 10. The conveyors 20 and 30 may be of any suitable type adapted to transfer particle-form solids at elevated temperatures without excessive attrition of the solid particles. Continuous bucket elevators, for example, have been found to be satisfactory for this purpose. It will be understood that the reactor and regenerator vessels may vary somewhat from the particular construction described hereinabove. For example, the regenerator may be of the multi-stage type comprised of a vertical series of alternating burning and cooling zones, each burning zone having a separate gas inlet and outlet and each cooling zone having a separate set of heat transfer tubes therein and separate external manifolding associated with said heat transfer tubes.

Referring now to Figure 2, there is shown the upper portion of the reaction vessel 12 and the feed hopper 10 and feed leg 11 located above the reaction vessel 12. Catalyst from the elevator is introduced into the hopper 10 through the conduit 31. The catalyst forms a continuous column, moving down through the feed leg 11 into the reactor 12. The feed leg 11 delivers directly into the head section 41 of the reactor 12, which head section is terminated by plate 42 extending horizontally across said head section. Depending from the plate 42 are the open end pipes 43 which extend down to the reactor reaction zone. Within the head section is maintained an accumulation of particle-form contact material from which contact material flows through pipes 43 to the reaction zone (not shown). Connected to the top of the head section is the pipe 17. The feed leg 11 is of such length that the head created by the column of contact material therein is greater than the pressure differential between the reactor head 41 and the hopper 10. The cross section of the feed leg is made large enough to permit the desired contact material flow rate.

At approximately 12 to 24 inches above the bottom of the feed leg 11 is located in the wall of the feed leg a temperature responsive thermocouple 44. This thermocouple 44 is electrically connected to a suitable relay 45, shown in block form only, and this in turn is electrically connected to a source of electrical power. Located a spaced distance above the thermocouple 44 in the feed leg 11 is a shut-off valve 46. This valve may be operated by a fluid motor 47 or other suitable electrical or mechanically operated motor. In the fluid line 48 leading to the motor 47 is placed a control valve 49, shown in block form only. By a suitable connection, the relay 45 may be made to operate the valve 49 in response to a predetermined drop in temperature in the feed leg 11, at the location of the thermocouple 44. This, in turn, will act to place valve 46 in the closed position.

In normal operation, a seal gas is introduced into the head of the reactor through the pipe 17, usually at a pressure of about 4 to 5 p. s. i. above atmospheric. The seal gas flows upwardly through the feed leg 11 to the free space above the catalyst column in the feed hopper 10, which is usually maintained at atmospheric pressure. The seal gas escapes through the vent pipe 50. When a stoppage occurs, usually in the upper section of the feed leg 11, the catalyst below the stoppage will drain from the feed leg exposing the thermocouple 44. There is a rapid drop in temperature at that point, which is used by the apparatus described above to automatically close the valve 46, just prior to removal of the remaining catalyst from the bottom of the feed leg. Without catalyst in the feed leg 11, the flow of seal gas would not be sufficient to prevent reactant fluids from flowing up from the reaction zone and on up the feed leg, because of the larger free area in the feed leg available for the flow of fluids when the catalyst is removed.

In addition to closing valve 46 to prevent loss of reactor seal, the relay 45 is made to operate, by suitable electrical connection, an annunciator located in the control room of the system. By observing the warning, the operator is able to rapidly shut down the equipment, preventing great disturbance of the operation and possible serious damage to the equipment.

On Figure 3 is shown another embodiment of this invention. This view is a vertical elevation of the reaction vessel, the hopper and feed leg located above, and the vessel outlet means shown below. As previously indicated, the catalyst from the elevator is fed through the conduit 31 to the top of the column of catalyst in the hopper 10. The catalyst gravitates downwardly through the feed leg 11 and reactor 12, and is removed from the bottom of the reaction vessel 12 through the outlet conduit 18. The flow of catalyst through the reactor 12 is normally controlled by the valve 19 in the outlet conduit 18. In this embodiment of the invention another valve 50 is placed in the conduit 18, and is maintained in the full open position during normal flow of catalyst in the feed leg. A thermocouple 44 is placed in the feed leg 11 at a location about 12 to 24 inches above the bottom of the feed leg. As previously indicated, when the flow of catalyst through the feed leg is interrupted by a stoppage in the feed leg, the catalyst level drops below the thermocouple and the thermocouple indicates a drop in temperature. This may be used to close valve 44 in the feed leg 11, as previously indicated. In addition, however, the drop in temperature may be used to trip the relay 51, which may be used to close the valve 50, preventing the removal of any more catalyst from the reactor 12, and thereby preventing the partial or complete removal of catalyst from the reactor 12. There are many obvious reasons why it is undesirable to partially or completely empty the reactor 12 of catalyst. The relay 51, receiving electrical power from a source not shown, may be used to control a valve 52 in a fluid line 53, which in turn can be used to operate a fluid operated motor 54. The motor 54 is suitably designed to completely close the valve 50. The response from the thermocouple 44 may also be used to operate an annunciator, enabling the operator to rapidly shut down the apparatus and prevent serious damage.

It shall be understood that the details of construction and of application of this invention given hereinabove are intended as exemplary and should not be construed as limiting the scope of this invention except as it is limited in the following claims.

I claim:

1. In a process for contacting fluids under pressure with a continuously flowing substantially compact body of particle-form, high temperature, solid material, the steps which comprise gravitating said material downwardly as a continuous compact column from a storage zone through a conduit to a solid material accumulating zone and thence, at a predetermined rate, to a pressurized reaction zone, introducing an inert seal gas under pressure to said accumulating zone, the temperature of said seal gas being maintained below the temperature of said solid material, continually sensing with a temperature-sensitive device the temperature in the lower portion of the said conduit, and automatically closing the conduit, in response to the temperature sensed by said temperature-sensitive device, to prevent the escape of any substantial amount of said fluid through said conduit when the temperature sensed by said temperature-sensitive device falls below a predetermined value, said value being in the range between the temperature of the solid material and the temperature of the seal gas.

2. In a process for contacting fluids under pressure with a continuously flowing substantially compact body of particle-form, high temperature, solid material, the steps which comprise gravitating said material downwardly as a continuous compact column from a storage zone through a conduit to a solid material accumulating zone and thence, at a predetermined rate, to a pressurized reaction zone, continuously withdrawing particle-form material from an exit in the lower portion of the said reaction zone, introducing an inert seal gas under pressure to said accumulating zone, the temperature of said seal gas being maintained below the temperature of said solid material, continuously sensing with a temperature-sensitive device the temperature in the lower portion of said conduit, and automatically closing the conduit and the exit of said reaction zone in response to the temperature sensed by said temperature-sensitive device, when the temperature sensed by said temperature-sensitive device falls below a predetermined value, said value being in the range between the temperature of the solid material and the temperature of the seal gas, to prevent the escape of any substantial amount of said fluid through said conduit and to prevent the reaction zone from being drained of solid material when the flow thereof is interrupted in said conduit.

3. A vertical vessel for receiving fluid under pressure, said vessel including a solid material accumulating zone and a reaction zone therebelow and a passage therebetween, a gas supply conduit connected to said material accumulating zone for supplying a seal gas thereto, a supply hopper above said vessel to receive hot, particle-form, solid material, the temperature of said seal gas being maintained below the temperature of said solid material, a solid material supply conduit connected between said accumulating zone in said hopper to continuously supply a gravitating column of said solid material from said hopper to said accumulating zone, an outlet conduit connected to the bottom of said reaction zone to receive said solid material after it has gravitated therethrough, a temperature-sensitive device located in the lower section of said solid material supply conduit to sense the temperature therein, a valve in said solid material supply conduit to control the flow of said solid material through said conduit, means operatively connecting said temperature-sensitive device and said valve to operate said valve in response to the temperature sensed by said temperature-sensitive device, to close said valve when temperature sensed by said temperature-sensitive device falls below a predetermined value, said predetermined value being in the range between the temperature of the solid material and the temperature of the seal gas.

4. A vertical vessel for receiving fluid under pressure, said vessel including a solid material accumulating zone and a reaction zone therebelow and a passage therebetween, a gas supply conduit connected to said material accumulating zone for supplying a seal gas thereto, a supply hopper above said vessel to receive hot, particle-form, solid material, the temperature of said seal gas being maintained below the temperature of said solid material, a solid material supply conduit connected between said accumulating zone in said hopper to continuously supply a gravitating column of said solid material from said hopper to said accumulating zone, an outlet conduit connected to the bottom of said reaction zone to receive said solid material after it has gravitated therethrough, a temperature-sensitive device located in the lower section of said solid material supply conduit to sense the temperature therein, valves located in said outlet conduit and in said solid material supply conduit to control the exit of said solid material from said reaction zone and to control the flow of said solid material in said solid material supply conduit, means operatively connecting said temperature-sensitive device to said valves to operate said valves in response to the temperature sensed by said temperature-sensitive device, to close said valve when the temperature sensed by said temperature-sensitive device falls below a predetermined value, said predetermined value being in the range between the temperature of the solid material and the temperature of the seal gas.

5. A vertical vessel for receiving fluid under pressure, said vessel including a solid material accumulating zone and a reaction zone therebelow and a passage therebetween, a gas supply conduit connected to said material accumulating zone for supplying a seal gas thereto, a supply hopper above said vessel to receive hot, particle-form, solid material, the temperature of said seal gas being maintained below the temperature of said solid material, a solid material supply conduit connected between said accumulating zone in said hopper to continuously supply a gravitating column of said solid material from said hopper to said accumulating zone, an outlet conduit connected to the bottom of said reaction zone to receive said solid material after it has gravitated therethrough, a temperature-sensitive device located in the lower section of said solid material supply conduit to sense the temperature therein, a valve in said solid material supply conduit to control the flow of said solid material through said conduit, a motor for closing said valve operatively connected therewith, a relay electrically connected to said motor to control the operation thereof, said relay also being electrically connected to said temperature sensitive device to cause said motor to close said valve when the temperature sensed by said temperature-sensitive device falls below a predetermined value, said value being in the range between the temperature of the solid material and the temperature of the seal gas.

6. A vertical vessel for receiving fluid under pressure, said vessel including a solid material accumulating zone and a reaction zone therebelow and a passage therebetween, a gas supply conduit connected to said material accumulating zone for supplying a seal gas thereto, a supply hopper above said vessel to receive hot, particle-form, solid material, the temperature of said seal gas being maintained below the temperature of said solid material, a solid material supply conduit connected between said accumulating zone and said hopper to continuously supply a gravitating column of said solid material from said hopper to said accumulating zone, an outlet conduit connected to the bottom of said reaction zone to receive said solid material after it has gravitated therethrough, a temperature-sensitive device located in the lower section of said solid material supply conduit to sense the temperature therein, valves located in said outlet conduit and in said solid material supply conduit to control the exit of said solid material from said reaction zone and to control the flow of said solid material through said solid material supply conduit, a motor operatively connected to each valve, a relay electrically connected to each motor, said relays also being electrically connected to said temperature-sensitive device to cause said motors to close said valves when the temperature sensed by said temperature-sensitive device drops below a predetermined value, said value being in the range between the temperature of the solid material and the temperature of the seal gas.

LLOYD WILSON HEAD.

REFERENCES CITED

The following references are of record in the file of this patent:

UNITED STATES PATENTS

| Number | Name | Date |
| --- | --- | --- |
| 2,410,309 | Simpson et al. | Oct. 29, 1946 |
| 2,432,872 | Ferro et al. | Dec. 16, 1947 |
| 2,432,873 | Ferro et al. | Dec. 16, 1947 |